(12) United States Patent
Tomita et al.

(10) Patent No.: US 8,508,708 B2
(45) Date of Patent: Aug. 13, 2013

(54) LIQUID CRYSTAL DISPLAY ELEMENT WITH STRUCTURES DEFINING NONLINEARLY ARRANGED OPENINGS LINKING CONTIGUOUS PIXELS

(75) Inventors: Junji Tomita, Kawasaki (JP); Masaki Nose, Kawasaki (JP); Tomohisa Shingai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/176,368

(22) Filed: Jul. 5, 2011

(65) Prior Publication Data

US 2011/0261304 A1  Oct. 27, 2011

Related U.S. Application Data

(60) Division of application No. 11/856,916, filed on Sep. 18, 2007, which is a continuation of application No. PCT/JP2005/004925, filed on Mar. 18, 2005.

(51) Int. Cl.
*G02F 1/1339* (2006.01)

(52) U.S. Cl.
USPC .......................................... 349/157; 349/156

(58) Field of Classification Search
USPC ................................. 349/155–157
See application file for complete search history.

(56) References Cited

U.S. PATENT DOCUMENTS

| 5,729,312 | A | | 3/1998 | Yamagishi et al. |
| 6,115,098 | A | * | 9/2000 | Kume et al. ................... 349/156 |
| 6,208,402 | B1 | * | 3/2001 | Tajima ........................... 349/156 |
| 6,518,944 | B1 | * | 2/2003 | Doane et al. .................... 345/87 |
| 7,751,018 | B2 | | 7/2010 | Tomita et al. |
| 2001/0038427 | A1 | | 11/2001 | Ueda et al. |
| 2004/0141112 | A1 | * | 7/2004 | Kang ............................. 349/113 |
| 2005/0286006 | A1 | * | 12/2005 | Yanagawa ..................... 349/153 |
| 2007/0152995 | A1 | | 7/2007 | Tomita et al. |

FOREIGN PATENT DOCUMENTS

| CN | 1480776 A | 3/2004 |
| GB | 2347006 A | 8/2000 |
| JP | 58-13515 U | 1/1983 |
| JP | 58-121023 A | 7/1983 |
| JP | 63-116126 A | 5/1988 |
| JP | 7-306414 A | 11/1995 |
| JP | 08-076131 A | 3/1996 |
| JP | 11-281983 A | 10/1999 |

(Continued)

OTHER PUBLICATIONS

Japanese Office Action dated Aug. 2, 2011, issued in corresponding Japanese Patent Application No. 2007-509068.

(Continued)

*Primary Examiner* — Lauren Nguyen
(74) *Attorney, Agent, or Firm* — Westerman, Hattori, Daniels & Adrian, LLP

(57) ABSTRACT

A liquid crystal layer sandwiched by a lower substrate 1 and an upper substrate comprises cross-shaped supports, a wall surface structure, and a seal member. The supports 15 are provided at the four sides of each pixel. Contiguous pixels are linked via openings between supports. The wall surface structure is provided in the periphery of the supports arranged in the form of a grid. The supports and the wall surface structure are a same member having adhesiveness. A portion of the wall surface structure is an inlet of liquid crystal. A seal member is provided at the perimeter of the wall surface structure 17. The liquid crystal poured from the inlet is poured into all of pixels via openings. A black matrix in the form of a grid, which covers the top side of all of the supports, is provided on the upper substrate.

15 Claims, 17 Drawing Sheets

(56) References Cited

FOREIGN PATENT DOCUMENTS

| JP | 2000-147527 | A | | 5/2000 |
|---|---|---|---|---|
| JP | 2001-242468 | A | | 9/2001 |
| JP | 2001-305551 | A | | 10/2001 |
| JP | 2001-311952 | A | | 11/2001 |
| JP | 2001-337332 | A | | 12/2001 |
| JP | 2004-198643 | A | | 7/2004 |
| JP | 2004-219948 | A | | 8/2004 |
| KR | 2001-0095014 | A | | 11/2001 |
| WO | 03/019275 | A1 | | 3/2003 |
| WO | WO-03-019275 | | * | 3/2003 |
| WO | 2006/030495 | A1 | | 3/2006 |

OTHER PUBLICATIONS

European Office Action dated Sep. 6, 2010, issued in corresponding European Patent Application No. 05721112.0.

Chinese Office Action dated Sep. 5, 2008, issued in corresponding Chinese Patent Application No. 2005800491337.

European Office Action dated May 26, 2009, issued in corresponding European patent Application No. 05721112.0.

European Office Action dated Oct. 9, 2008, issued in corresponding European Patent Application No. 05721112.0.

International Search Report of PCT/JP2005/004925, date of mailing Jun. 14, 2005.

Korean Office Action dated Jan. 5, 2009, issued in corresponding Korean Patent Application No. 10-2007-7021255.

Notice of Rejection Ground mailed on Aug. 18, 2006.

Office Action issued on Feb. 13, 2012 in corresponding European Patent Application 05721112.0-1228.

* cited by examiner

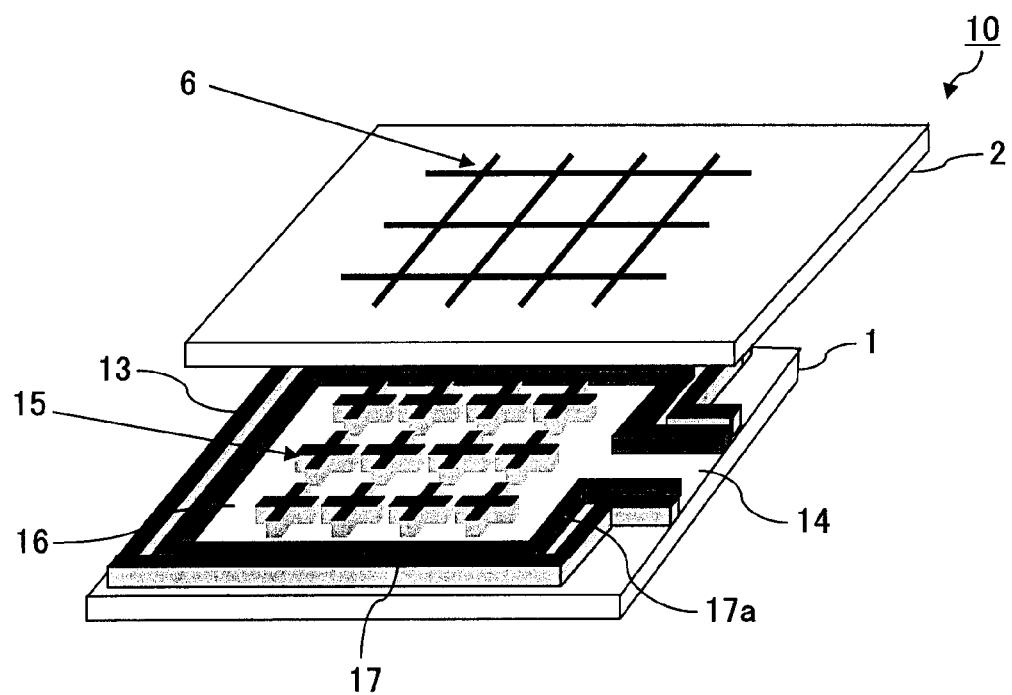
F I G. 2

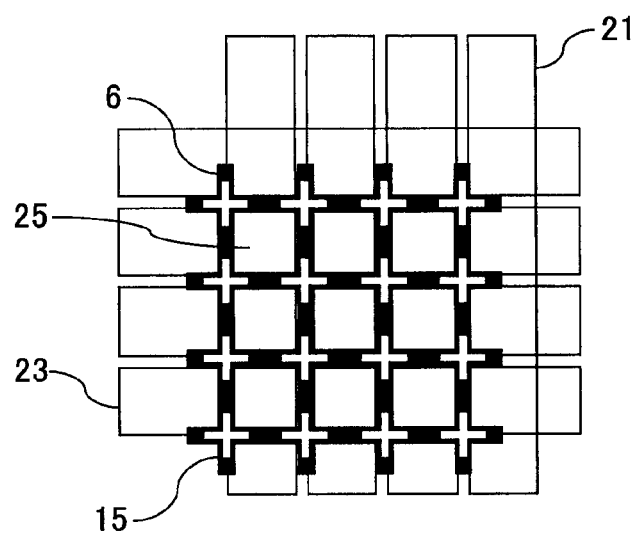
F I G. 3

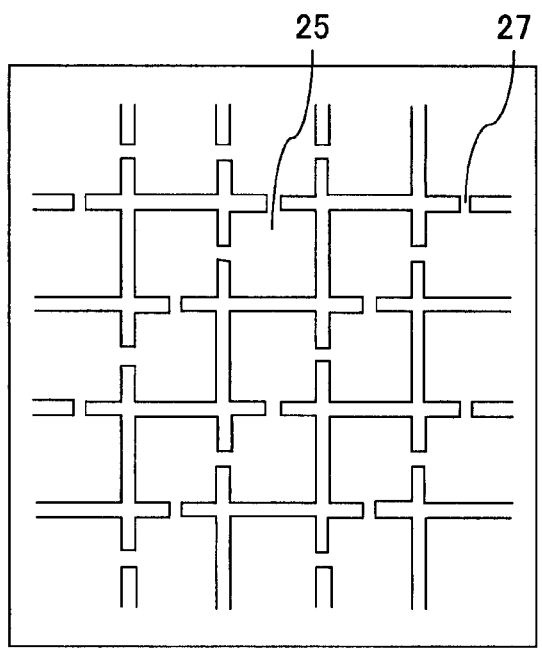
F I G. 7

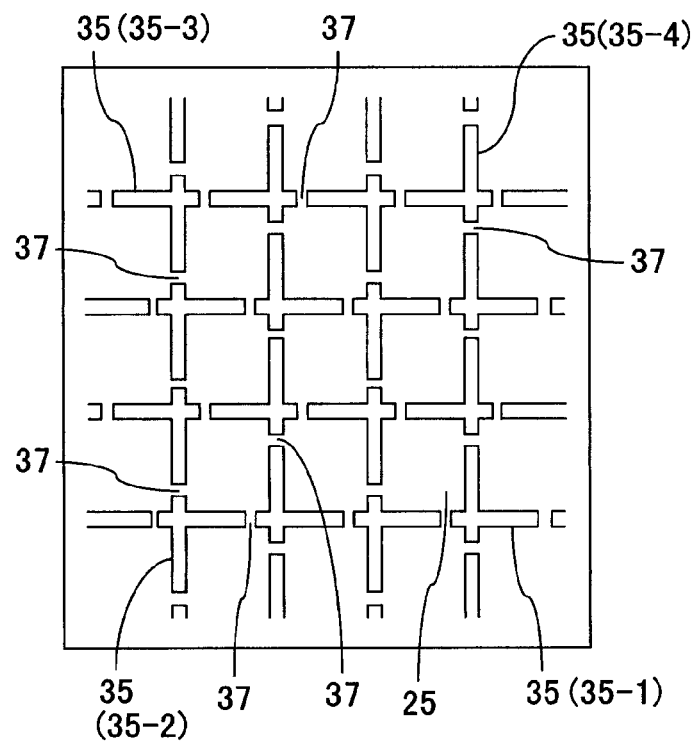
F I G. 8

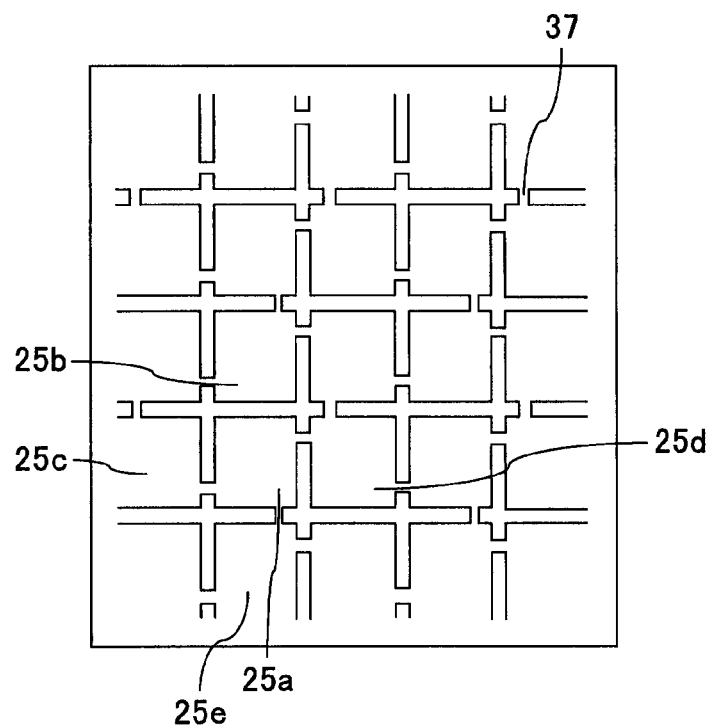
F I G. 9

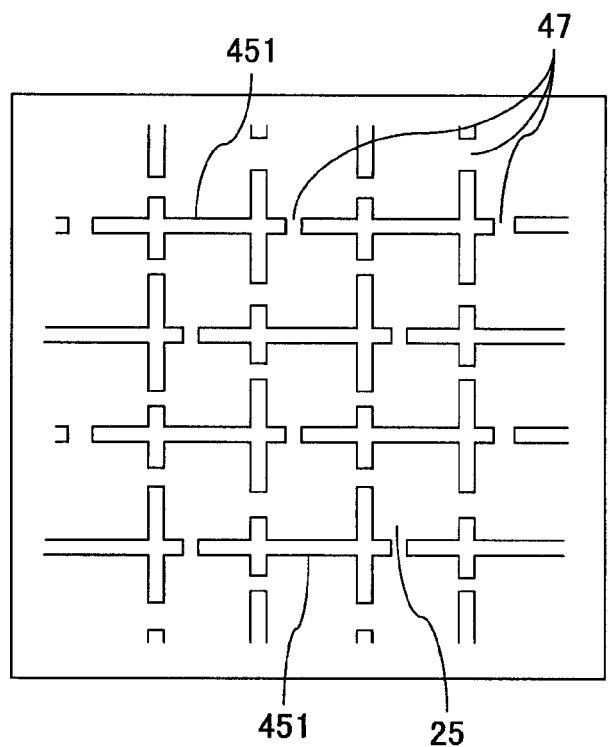
F I G. 1 2

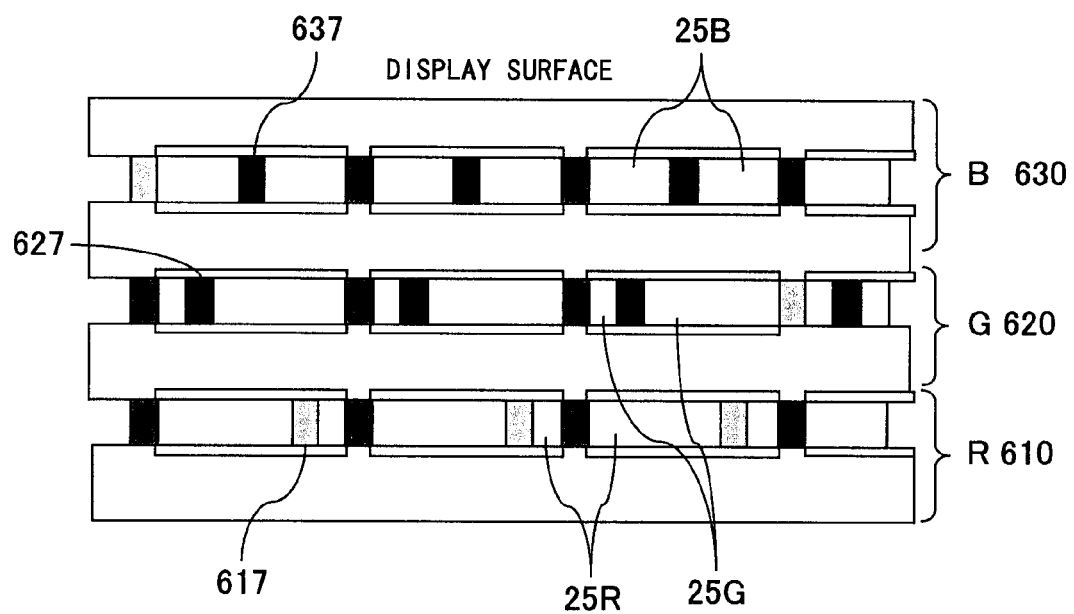
F I G. 1 6

LIQUID CRYSTAL DISPLAY ELEMENT WITH STRUCTURES DEFINING NONLINEARLY ARRANGED OPENINGS LINKING CONTIGUOUS PIXELS

CROSS-REFERENCE TO RELATED APPLICATION

This application is a divisional of application Ser. No. 11/856,916, filed Sep. 18, 2007, which is a continuation of PCT application of PCT/JP2005/004925, filed Mar. 18, 2005, the entire contents of which are incorporated herein by reference.

BACKGROUND OF THE INVENTION

1. Field of the Invention

The present invention relates to a liquid crystal display element of dot matrix system, and more particularly, to a liquid crystal display element that is superior in flexibility.

2. Description of the Related Art

In the future, electronic paper that can hold a display without a power supply and can electrically rewrite contents of the display is expected to become rapidly widespread. Electronic paper implements a book, a magazine, newspaper, etc., which are conventionally paper printed matters, by using an apparatus that can electrically rewrite a display, and has superior characteristics of paper printed matters, such as thinness, lightweight, and easiness to look. Electronic paper is superior to paper printed matters in a point that contents of a display can be rewritten. Accordingly, electronic paper is not discarded like paper printed matters. Therefore, electronic paper greatly contributes to reductions in the consumption of paper resources if it becomes widespread as an alternative to paper printed matters. This is considered to be very useful also from the viewpoint of environmental protection.

As applications of electronic paper, an electronic book, an electronic newspaper, an electronic poster, an electronic dictionary, etc. are considered. As characteristics demanded for electronic paper, the following (1) to (5) and the like exist.
(1) electrical rewritability of display data
(2) ultra-low consumption power
(3) easy on the eyes, and difficult to be tired (very easy to look)
(4) easy to carry (lightweight and easy to tote)
(5) as thin as paper and bendable (lightweight and flexible)

Electronic paper has been studied and developed by using an electrophoresis system, a twist ball system, a liquid crystal display, an organic EL (electro-luminescence) display, etc.

The electrophoresis system is a system for moving charged particles in the air or a liquid. The twist ball system is a system for rotating two-color-coded charged particles. The organic EL display (organic electro-luminescence display) is a self-luminous display unit having a structure where a plurality of thin films made of an organic material are sandwiched by negative and positive electrodes. The liquid crystal display is a non-self-luminous display unit having a structure where a liquid crystal layer is sandwiched by a pixel electrode and an opposed electrode.

Electronic paper implemented with the liquid crystal display has been studied and developed by using cholesteric liquid crystal of selective reflection type having bistability. Here, the bistability is a nature that a liquid crystal exhibits stability in two different alignment states, and the cholesteric liquid crystal has a nature that two stable states such as planar and focal conic states are maintained for a long time even after an electric field is removed. For the cholesteric liquid crystal, incident light is interfered and reflected in the planar state, whereas incident light is transmitted in the focal conic state. Accordingly, a liquid crystal panel using the cholesteric liquid crystal as a liquid crystal layer, the lightness/darkness of light can be displayed with the selective reflection of incident light in the liquid crystal layer. This eliminates the need for a polarization plate. The cholesteric liquid crystal is also called chiral nematic liquid crystal.

Since the cholesteric liquid crystal reflects a color with the interference of liquid crystal, a color display can be made only by stacking the liquid crystals. Therefore, a liquid crystal display system using the cholesteric liquid crystal (here, referred to as a cholesteric liquid crystal system for the sake of convenience) is overwhelmingly superior in a color display to other systems such as the above described electrophoresis system, etc. With the other systems, color filters tinted in three colors must be arranged for each pixel. Therefore, its brightness is one-third of the cholesteric liquid crystal system. Accordingly, for the other systems, improving the brightness is a significant challenge to implement electronic paper.

As described above, the cholesteric liquid crystal has an advantage that a color display is easy, but its most significant challenge is to impart flexibility, which is the characteristic of electronic paper.

For a liquid crystal display element, a uniform cell of a gap of several pm is required. Normally, a cell is formed by sandwiching a liquid crystal layer (several μm) between upper and lower glass substrates. For a normal liquid crystal panel of TN (Twisted Nematic) type or STN (Super Twisted Nematic) type, also some liquid crystal display element (plastic liquid crystal) using a film substrate made of transparent special resin is implemented. The plastic liquid crystal element can be reduced in thickness and weight compared with the liquid crystal of a glass substrate, and also has high endurance and a high strength against bending. Accordingly, the plastic liquid crystal is freely bendable like paper, and suitable for electronic paper.

Here, a conventional configuration for implementing a uniform cell gap of a liquid crystal panel is described.

FIG. 1 is an exploded view of the cell structure of a liquid crystal display element of a dot matrix structure, which implements a uniform cell gap by using a support spacer.

The liquid crystal display element shown in this figure has a structure where a liquid crystal layer is sandwiched between a first substrate (lower substrate) 1 and a second substrate (upper substrate) 2. The liquid crystal layer is composed of a seal member 3, adhesive supports 5, etc. On the surface of the first substrate 1, a plurality of transparent column electrodes (not shown) are formed. Additionally, on the back of the second substrate 2, a plurality of transparent row electrodes (not shown), which vertically intersect the column electrodes, are formed. On the side of the liquid crystal layer on the first substrate 1 on which the column electrodes are formed, the seal member 3 is formed.

The seal member 3 is an adhesive of thermal hardening type or UV (ultraviolet) hardening type manufactured in a printing process, and configures the periphery of the liquid crystal layer. In the center of one side 3a of the seal member 3, an opening is provided, and both of its ends extend to form an inlet 4 of liquid crystal. Namely, a portion of the seal member 3 is the inlet 4 of the liquid crystal, via which the liquid crystal is poured into a region enclosed by the seal member 3.

Within the region enclosed by the seal member 3, a plurality of adhesive supports 5, which serve as spacers of the liquid crystal layer, are formed. These adhesive supports 5 are formed at the four corners of each pixel of the liquid crystal layer.

The adhesive supports 5 are members that take the shape of a cylinder, and can be bonded to the second substrate 2. Therefore, if the first substrate 1, on which the seal member 3 and the adhesive supports 5 are formed, and the second substrate 2 are stacked, the first substrate 1 and the second substrate 2 are adhered with the seal member 3 and the adhesive supports 4. The seal member 3 is, for example, a member that is hardened by being heated.

With the liquid crystal display element having the above described configuration using the cholestric liquid crystal of selective reflection type for the liquid crystal layer, a portion between pixels, in which an electrode is not provided in an upper or lower opposed position, stays lit up. Therefore, to improve the contrast of a pixel by preventing the portion from staying lit up, a black matrix 6 is formed on the second substrate 2. This black matrix 6 is a grid-shaped pattern corresponding to portions (four sides of a pixel) of a liquid crystal layer, in which an electrode (row or column electrode) is not arranged downward or upward.

In the liquid crystal display element having the above described configuration, the adhesive supports 5 serve as spacers, whereby a width (cell gap) between the first substrate 1 and the second substrate 2 is kept uniform.

A support like the adhesive support 5 can be formed, for example, with patterning using a photolithography disclosed by Japanese Unexamined Utility Model Application Publication No. 58-13515, or Japanese Unexamined Patent Application Publication No. H8-76131.

In the liquid crystal display element having the above described configuration, cholesteric liquid crystal is poured from the inlet 4, whereby a cholesteric liquid crystal display element of selective reflection type can be implemented. However, to the cholesteric liquid crystal display element of selective reflection type, flexibility cannot be imparted only by implementing a uniform cell gap.

Because liquid crystal is a liquid, it flows by force applied by operations such as bending of a liquid crystal panel, or pressing of its display surface, and a display state varies. Since the display of the liquid crystal panel of TN type or STN type continues to be electrically driven, its display state can immediately revert to the original state even if it varies. However, for the cholesteric liquid crystal having the memory property of a display, its display does not revert to the original state until it is again driven.

A method for forming a support like the adhesive support 5 shown in FIG. 5 in the cholesteric liquid crystal display element is disclosed, for example, by Japanese Published Unexamined Patent Application Publication No. 2000-146527. The invention disclosed by this publication mainly aims at ensuring the uniformity of cell gaps, and does not aim at holding the memory property of a cholesteric liquid crystal display element when a liquid crystal panel is bent or its display surface is pressed.

To apply the cholesteric liquid crystal of selective reflection type to electronic paper, implementing a structure with which a display does not vary even if electronic paper is pressed or bent was the greatest challenge.

As a result of creating a liquid crystal cell having the support structure shown in FIG. 1 with a film substrate of 0.125 μm, its display varied only by being held by hand. To prevent the display from varying, a robust housing was required for the support structure of the liquid crystal cell, and it was impossible to apply this liquid crystal cell to electronic paper having flexibility.

The present inventor ascertained the mechanism, with which the display of a liquid crystal cell using cholestric liquid crystal having a conventional support structure varies with the pressing force of its display surface, by experiment. This mechanism is disclosed by PCT Application No. PCT/JP2004/013380 previously filed by the present inventor.

The cause of the above described display variance is the fluidity of liquid crystal (cholesteric liquid crystal), which is resultant from pressing force applied to a display surface, or the bending of a liquid crystal cell, and the problem of the display variance can be solved by suppressing this fluidity. A spacer structure using a cylinder or a square support cannot suppress the fluidity of liquid crystal. Also a support having a stripe structure for the uniformity of cell gaps is proposed. With this structure, however, liquid crystal easily flows.

SUMMARY OF THE INVENTION

According to one aspect of the present invention, there is provided a liquid crystal display unit having a first substrate being arranged a first electrode on the first substrate; a second substrate being arranged a second electrode on the second substrate; a liquid crystal layer being configured between the first substrate and the second substrate; a plurality of pixels being provided in the liquid crystal display; a first wall surface structure being arranged on a side face of each side of said each pixels; and a openings having at least two openings that link contiguous pixels in the first wall surface structure, being narrow than a width of the first wall surface structure.

According to one aspect of the present invention, there is provided a liquid crystal display unit having a first substrate being arranged a first electrode on the first substrate; a second substrate being arranged a second electrode on the second substrate; a liquid crystal layer being configured between the first substrate and the second substrate; a plurality of pixels being provided in the liquid crystal display; and a first wall surface structure being arranged on a side face of each side of said each pixels; wherein a part of the first wall surface structure connects the first electrode or the second electrode.

According to one aspect of the present invention, there is provided a liquid crystal display unit having a first substrate being arranged a first electrode on the first substrate; a second substrate being arranged a second electrode on the second substrate; a liquid crystal layer being configured between the first substrate and the second substrate; a plurality of pixels being provided in the liquid crystal display; a first wall surface structure being arranged on a side face of each side of said each pixels; and a second wall surface structure being arranged to surrounding of the first wall surface structure; wherein the first wall surface structure encloses all of side faces of said each pixels.

BRIEF DESCRIPTION OF DRAWINGS

FIG. 2 is an exploded view showing the entire configuration of a liquid crystal display element according to a preferred embodiment of the present invention.

FIG. 3 is a schematic showing the arrangement configuration of supports in the liquid crystal display element according to the preferred embodiment.

FIG. 7 shows the arrangement pattern of supports in a liquid crystal layer in an implementation example 3 of the liquid crystal display element according to the preferred embodiment.

FIG. 8 shows the arrangement pattern of supports in a liquid crystal layer in an implementation example 4 of the liquid crystal display element according to the preferred embodiment.

FIG. 9 shows the arrangement pattern of supports in a liquid crystal layer in an implementation example 5 of the liquid crystal display element according to the preferred embodiment.

FIG. 12 shows the arrangement pattern of supports in a liquid crystal layer in an implementation example 8 of the liquid crystal display element according to the preferred embodiment.

FIG. 16 is a cross-sectional view of a color liquid crystal display element using cholesteric liquid crystal of selective reflection type, which is an implementation example 11 of the present invention.

DESCRIPTION OF THE PREFERRED EMBODIMENTS

Preferred embodiments according to the present invention are described below with reference to the drawings.

Figure 4:
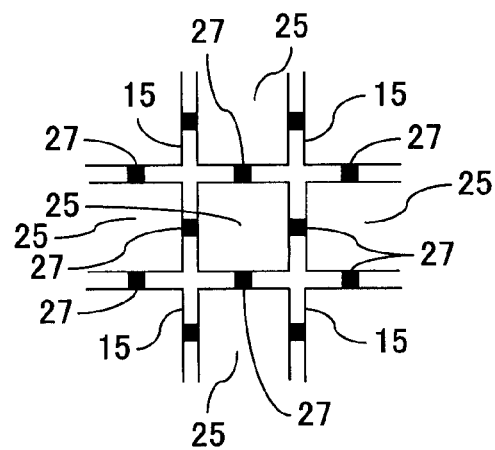
FIG. 4 shows the arrangement configuration of openings of a pixel, which are provided between supports, in the liquid crystal display element according to the preferred embodiment.

FIGS. 2 and 3 show the cell structure of a liquid crystal display element of matrix system using cholesteric liquid crystal, which is one preferred embodiment of the present invention. FIG. 2 is an exploded view showing the entire configuration of the liquid crystal display element according to the preferred embodiment, FIG. 3 is a schematic showing the arrangement configuration of supports in the liquid crystal display element according to the preferred embodiment, and FIG. 4 shows the arrangement configuration of openings provided between supports in the liquid crystal display element according to the preferred embodiment.

Figure 1:
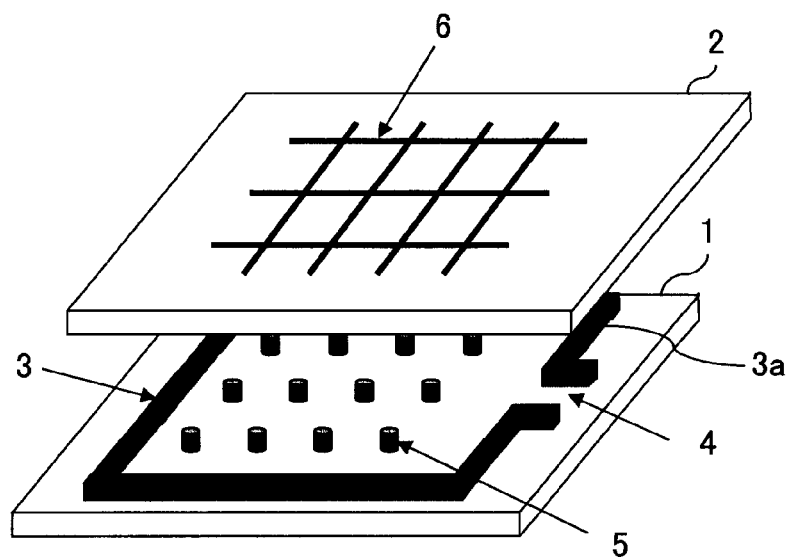
FIG. 1 is an exploded view showing a cell structure of a liquid crystal display element of a conventional dot matrix structure, which implements a uniform cell gap by using a support spacer.

Initially, the entire configuration of the liquid crystal display element of matrix system (hereinafter referred to simply as a liquid crystal display element) according to this preferred embodiment is described with reference to FIG. 2. In FIG. 2, the same constituent elements as those of FIG. 1 are denoted with the same reference numerals.

The most distinguished characteristic, which is different from a conventional liquid crystal display element of matrix system, of the cell structure of the liquid crystal display element 10 of matrix system according to this preferred embodiment shown in FIG. 2 is the shape of a support 15 (adhesive support) 15 in a liquid crystal layer.

The support 15 provided in the liquid crystal layer of the liquid crystal display element 10 is a wall surface structure (first wall surface structure) the cross-section of which is cross-shaped, and manufactured, for example, with photolithography. This support is of a material having a property adhering to an opposed second substrate 2. Supports 15 are provided at the four sides (corners?) of each pixel. Additionally, as a spacer of the liquid crystal layer, this wall surface structure and a conventional spherical spacer or a square support spacer may be used together.

FIG. 3 is a schematic showing the arrangement form (arrangement pattern) of the supports 15.

A portion where a column electrode 21 and a row electrode (scanning electrode) 23 intersect is a pixel 25. At the four sides of this pixel 25, the supports 15 are provided. At the perimeters of all of the supports 15, a wall surface structure (second wall surface structure) 17 that stipulates the outer frame of a region (liquid crystal pouring region), into which liquid crystal is poured, is arranged. The entire shape of the wall surface structure 17 is nearly rectangular, and an inlet 14 of the liquid crystal is provided at the center of one side 17a. Namely, this inlet 14 is a portion of the wall surface structure 17. This wall surface structure 17 is a member having adhesiveness. The supports 15 and the wall surface structure 17 may be a same member. In this case, they can be simultaneously formed in a photolithography process.

Outside the wall surface structure 17, a seal member 13 is arranged apart by a predetermined distance. This seal member 13 is arranged at the perimeter of a liquid crystal display element cell. This preferred embodiment is configured so that the wall surface structure 17 having adhesiveness can be used along with the seal member 13 when the substrates 1 and 2 are bonded.

As described above, the cholesteric liquid crystal of selective reflection type stays lit up in a gap between pixels, in which no electrode exists. Therefore, a black matrix must be provided. Accordingly, the black matrix 6 is provided on the back of the second substrate 2 (see FIG. 2). As shown in FIG. 3, the black matrix 6 is provided in a position overlapping the supports 15 in a vertical direction (direction vertical to the display surface).

As shown in FIG. 4, contiguous pixels 25 are linked via an opening 27 provided between the supports 15. This opening 27 is provided to pour the liquid crystal into all of pixels 25 in the liquid crystal layer. The liquid crystal is poured, for example, with a vacuum infusion method, etc.

In the meantime, in the cell structure of the liquid crystal display element 10 according to this preferred embodiment, the support 15 is cross-shaped. Therefore, the opening 27 that links pixels 25 can be made infinitesimal. The support 15 can be used as a replacement for the black matrix when the opening 27 is made infinitesimal as described above, whereby the black matrix 6 can be also omitted.

In the liquid crystal display element 10 according to this preferred embodiment shown in FIGS. 2 to 4, the perimeter of a pixel is enclosed by supports 51, which are cross-shaped wall surface structures, except for infinitesimal gaps (openings 27) at the centers of four sides. Therefore, the flow of the liquid crystal poured into the pixel is restricted. Therefore, even if pressing force is applied to the display surface or the element is bent, a display of the pixel can be prevented from varying.

Actually, the liquid crystal display element 10 according to this preferred embodiment was created as a cholesteric liquid crystal display element the pixel pitch of which is 0.24 mm, the opening 27 of which is 0.03 mm, the display size of which is 3.8 inches, the film substrate of which has a thickness of 0.125 mm, and the liquid crystal layer of which has a thickness of 4.0 μm, and a practical test was conducted for this element. As a result, it was verified that the display of the cholesteric liquid crystal display element does not vary even if it is bent with a curvature radius of 60 mm. For the conventional cholesteric liquid crystal display element shown in FIG. 1, its display varied only by holding the element by hand.

As described above, with the liquid crystal display element 10 according to this preferred embodiment, a liquid crystal display element of selective reflection type having flexibility (which is applicable to electronic paper) can be implemented.

Additionally, the liquid crystal display element 10 according to this preferred embodiment has the structure where the wall surface structure 17 is arranged along with the seal member on the inner side of the seal member 13 as shown in FIG. 2. Therefore, in the liquid crystal display element 10 according to this preferred embodiment, the liquid crystal does not leak outside the wall surface structure 17, and the seal member 13 and the liquid crystal do not contact unlike a conventional liquid crystal display element. For the conventional liquid crystal display element, an expensive material must be used for a seal member in order to prevent the liquid crystal from contacting the seal member and being contaminated by impurities. Besides, it is difficult to select a material having high adhesiveness as the seal member.

For the liquid crystal display element 10 according to this preferred embodiment, its wall surface structure 17 is of a material having adhesiveness. Therefore, the liquid crystal display element 10 can be also configured by omitting the seal member 13. Even when the liquid crystal display element 10 is configured by using the seal member, there is no need to restrict the seal member 13 due to the above described reason. Accordingly, a low-cost liquid crystal display element can be implemented with the liquid crystal display element 10 according to this preferred embodiment.

IMPLEMENTATION EXAMPLE 1

Figure 5:
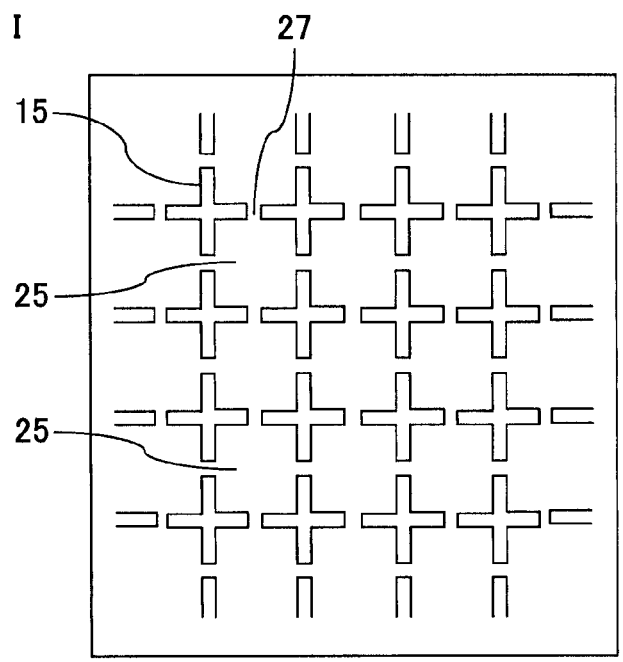
FIG. 5 shows the arrangement pattern of supports in a liquid crystal layer in an implementation example 1 of the liquid crystal display element according to the preferred embodiment.

FIG. 5 shows the arrangement pattern (a support arrangement pattern) of supports 15 in the above described liquid crystal display element 10. In the liquid crystal display element 10, a pixel 25 is linked to all of its contiguous pixels via openings 27. Although the openings 27 are required to pour the liquid crystal into each pixel 25, they are not required to be provided between contiguous pixels 25 in all cases (there is no need to link a pixel 25 to all of its four contiguous pixels via openings 27).

IMPLEMENTATION EXAMPLE 2

Figure 6:
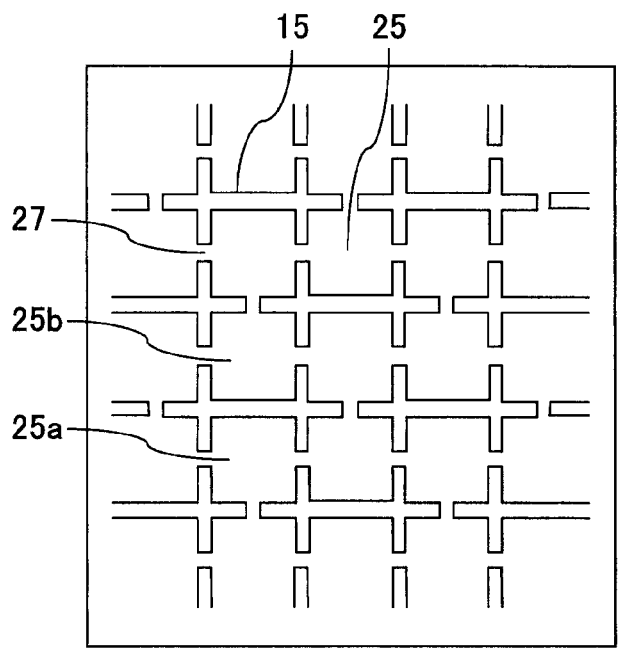
FIG. 6 shows the arrangement pattern of supports in a liquid crystal layer in an implementation example 2 of the liquid crystal display element according to the preferred embodiment.

FIG. 6 exemplifies another configuration of the support arrangement pattern in the liquid crystal display element 10. In the example shown in FIG. 6, a pixel 25 is linked to its three contiguous pixels via openings 27. Accordingly, for example, pixels 25a and 25b are not linked via an opening 27. A support structure shown in FIG. 6 is formed by patterning contiguous supports 15, which are contiguous right and left, to be alternately linked in the liquid crystal display element of the implementation example 1. At this time, supports 15 to be linked are shifted right or left by 1 in odd- and even-numbered rows.

IMPLEMENTATION EXAMPLE 3

FIG. 7 exemplifies a further configuration of the support arrangement pattern in the liquid crystal display element 10.

In the example shown in FIG. 7, a pixel 25 is linked to its two contiguous pixels via openings 27. A support structure shown in FIG. 7 is formed by patterning supports, which are contiguous upward and downward, to be alternately linked in the liquid crystal display element of the implementation example 1. At this time, supports 15 to be linked are shifted upward or downward by 1 in odd- and even-numbered columns.

In a fundamental structure of the liquid crystal display element in this implementation example, the fluidity of liquid crystal poured into a pixel 25 is restricted stronger as the number of openings 27 becomes smaller. Therefore, the endurance of a display variance against the bending of the element or pressing force applied to the display surface becomes high. Additionally, as a gap width of an opening 27 is smaller, the above described endurance of the display variance is improved. Note that, however, the amount of time required in the liquid crystal pouring process increases as the gap of an opening 27 is smaller. Furthermore, it is desirable to heat the liquid crystal in the liquid crystal pouring process because the viscosity of the liquid crystal becomes low at a high temperature. Also pressurization is effective at shortening the amount of time.

IMPLEMENTATION EXAMPLE 4

FIG. 8 exemplifies a still further configuration of the support arrangement pattern in the liquid crystal display element according to this preferred embodiment.

There are four types of supports shown in this figure. One type is a nearly L-shaped support 35-1, the three other types have shapes implemented by rotating the support 35-1 clockwise by 90, 180, and 270 degrees respectively. The support 35-2 is a support implemented by rotating the support 35-1 by 90 degrees, the support 35-3 is a support implemented by rotating the support 35-1 by 180 degrees, and the support 35-4 is a support implemented by rotating the support 35-1 by 270 degrees.

In this implementation example, these four types of supports 35-1 to 35-4 are arranged at four corners of a pixel 25. Namely, the supports 35-1, 35-2, 35-3, and 35-4 are respectively arranged at an upper left corner, an upper right corner, a lower right corner, and a lower left corner.

The perimeter of a pixel 25 is configured by being enclosed with these four types of supports 35 (35-1 to 35-4). Therefore, an opening 37 in this implementation example is arranged in a position obtained by moving the opening 27 of the implementation example 1 upward, downward, right, or left.

In the pattern configuration of the supports 15 in the implementation example 1, the openings 27 are aligned in a linear manner vertically or horizontally. Therefore, the liquid crystal within a pixel 25 is easy to flow in this linear direction. Actually, as a result of prototyping the liquid crystal display element 10 of the implementation example 1 and conducting an experiment, a display was proved to vary from a portion where the openings 27 are aligned in a linear manner.

Therefore, a display variance, which is problematic in the liquid crystal display element 10 of the implementation example 1, can be prevented by patterning the supports 37 not to align the openings 37 in a linear manner as shown in FIG. 8.

IMPLEMENTATION EXAMPLE 5

FIG. 9 shows a still further example of the support arrangement pattern in the liquid crystal display element according to this preferred embodiment.

In the implementation example 5, contiguous supports 35 of the implementation example 4 are linked with a method similar to that of the implementation example 2. As a result, a pixel 25*a* is linked to its right and left pixels 25*c* and 25*d*, and a downward pixel 25*e* via openings 37, but it is not linked to its upward pixel 25*b*.

As described above, each pixel 25 is linked to three pixels among four pixels, which are contiguous upward, downward, right, and left, via openings 37 in the implementation example 5.

IMPLEMENTATION EXAMPLE 6

Figure 10:
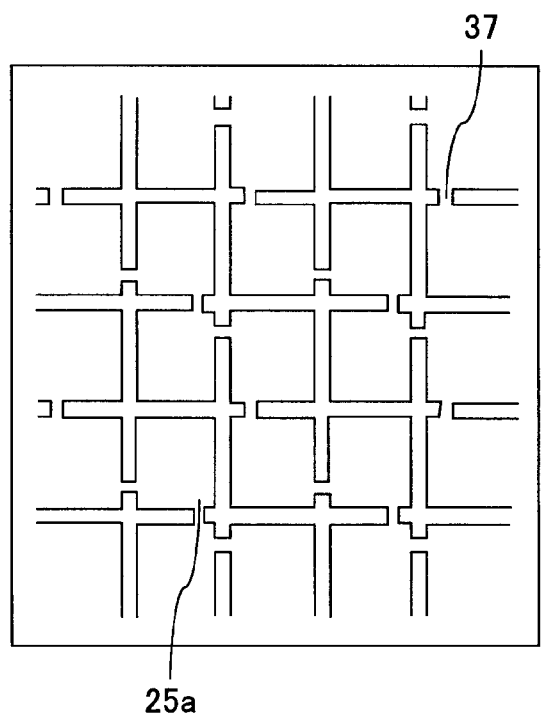
FIG. 10 shows the arrangement pattern of supports in a liquid crystal layer in an implementation example 6 of the liquid crystal display element according to the preferred embodiment.

FIG. 10 shows a still further example of the support arrangement pattern in the liquid crystal display element according to this preferred embodiment.

In the implementation example 6, contiguous supports 35 of the implementation example 4 are linked with a method similar to that of the implementation example 3. As a result, a pixel 25*a* is linked to its left pixel 25*c* and downward pixel 25*e* via openings 37, but it is not linked to its upward pixel 25*b* and right pixel 25*d*.

As described above, each pixel 25 is linked to two pixels among four pixels, which are contiguous upward, downward, right, and left, via openings 37 in the implementation example 6.

In the liquid crystal display elements of the implementation examples 5 and 6, the flow of the liquid crystal within a pixel 25 can be suppressed more effectively than that in the liquid crystal display element of the implementation example 4.

For the liquid crystal layers of the above described implementation examples 4 to 6, a portion (such as a slim portion) of the pattern is sometimes lost in a photolithography process if a support is infinitesimal, and the deterioration of process yield becomes a concern. For example, if the width and the length of a slim portion are approximately 10 μm and 150 μm respectively in a support, there is a high probability that the support formed in the photolithography process is easy to topple over and peel off.

Figure 11:
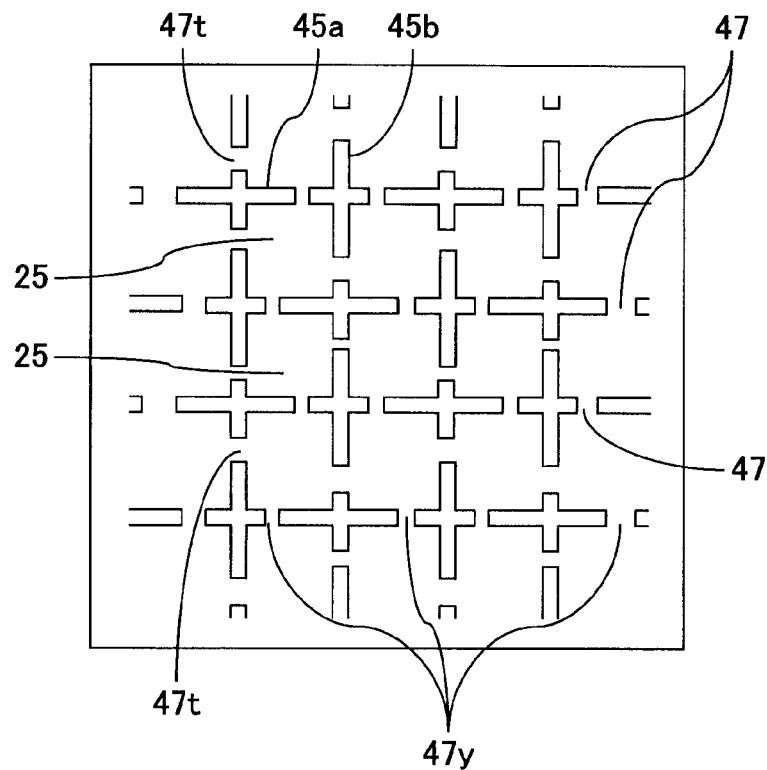
FIG. 11 shows the arrangement pattern of supports in a liquid crystal layer in an implementation example 7 of the liquid crystal display element according to the preferred embodiment.

Accordingly, as a result of transforming the support to a shape shown in FIG. 11, a loss caused by peel-off can be prevented at the time of development in the photolithography process.

IMPLEMENTATION EXAMPLE 7

FIG. 11 shows a still further example of the support arrangement pattern in the liquid crystal display element according to this preferred embodiment.

A liquid crystal layer of the implementation example 7 has a pattern configuration where two types of supports 45*a* and 45*b* are alternately arranged. The support 45*b* has a shape obtained by rotating the support 45*a* clockwise by 180 degrees with its center as an axis.

In the liquid crystal layer of the implementation example 7, openings 47 of contiguous pixels 25 are not aligned in a linear manner, whereby the fluidity of the liquid crystal within a pixel 25 can be suppressed. Additionally, since each support 45 (45*a*, 45*b*) has a highly symmetrical shape (the shape symmetrical with respect to a point), it is proved that the support is difficult to peel off in the photolithography process.

IMPLEMENTATION EXAMPLE 8

FIG. 12 shows a still further example of the support arrangement pattern in the liquid crystal display element according to this preferred embodiment.

In a liquid crystal layer of the implementation example 8, the two types of supports 45*a* and 45*b* in the liquid crystal layer of the implementation example 7 are linked by a rule similar to that of the liquid crystal layer of the implementation example 5. Namely, the liquid crystal layer of the implementation example 8 has a configuration where horizontally contiguous two supports (the supports 45*a* and 45*b*) in the liquid crystal layer of the implementation example 7 are linked and integrated.

The linkage and the integration of these two contiguous supports 45 (the supports 45*a* and 45*b*) are shifted by 1 in odd- and even-numbered rows. As a result, all of odd-numbered lines have the same arrangement pattern (a first arrangement pattern) of supports 451. In the meantime, all of even-numbered lines have the same pattern (a second arrangement pattern) of supports 451.

In the liquid crystal layer of the implementation example 8, each pixel has three openings 47, and is linked to three contiguous pixels, which exist right, left, and upward or downward, via the openings 47. However, the arrangement positions of the openings 47 in odd- and even-numbered rows differ. Therefore, the openings 47 of the pixels 25 are not aligned in a linear manner. Accordingly, the fluidity of liquid crystal within each pixel 25 is suppressed more than that in the implementation example 7.

IMPLEMENTATION EXAMPLE 9

Figure 13:
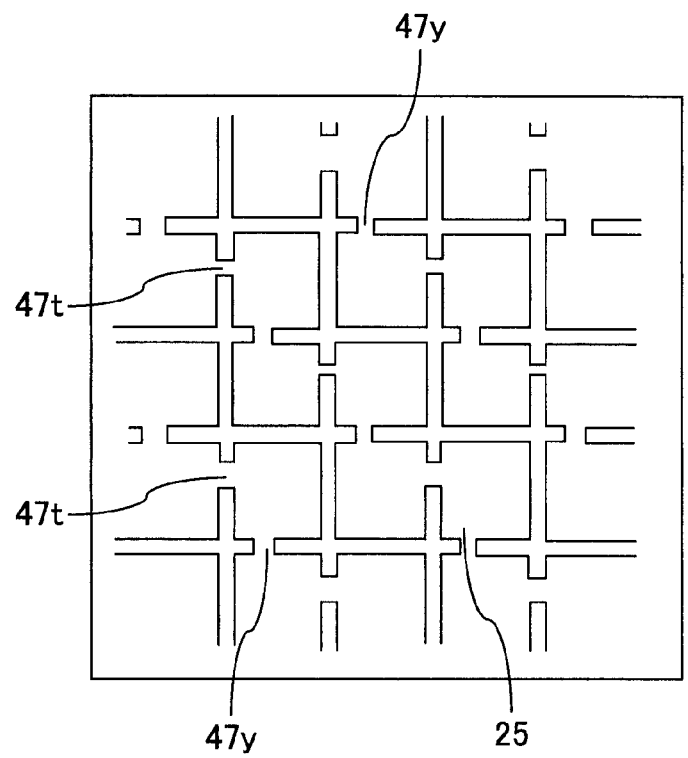
FIG. 13 shows the arrangement pattern of supports in a liquid crystal layer in an implementation example 9 of the liquid crystal display element according to the preferred embodiment.

FIG. 13 shows a still further example of the support arrangement pattern in the liquid crystal display element according to this preferred embodiment.

In a liquid crystal layer of the implementation example 9, the two types of supports 45*a* and 45*b* in the liquid crystal layer of the implementation example 7 are linked with a rule similar to that of the liquid crystal layer of the implementation example 6. The liquid crystal layer of the implementation example 9 is configured by linking and integrating the two types of supports (the supports 45*a* and 45*b*) in the liquid crystal layer of the implementation example 7 in both of vertical and horizontal directions. Specifically, every other opening 47*t* arranged in the vertical direction is linked, and every other opening 47*y* arranged in the horizontal direction is linked.

As a result of linking the openings 47*t* and 47*y* as described above, a pixel 25 of the liquid crystal layer of the implementation example 9 has two openings 47 (the openings 47*t* and 47*y*). The pixel 25 in the liquid crystal layer of the implementation example 9 is linked to two pixels such as its left or right contiguous pixel, and its upward or downward contiguous pixel via the openings (the openings 47*t* and 47*y*). However, these openings 47 are not aligned in a linear manner. Accordingly, the fluidity of the liquid crystal in a pixel of the liquid crystal layer of the implementation example 9 is suppressed more than that in a pixel of the liquid crystal layer of the implementation example 7. Additionally, the number of openings in a pixel of the implementation example 9 is smaller than that in a pixel of the implementation example 8. Therefore, the fluidity of the poured liquid crystal in a pixel of the implementation example 9 is lower than that in a pixel of the implementation example 8.

IMPLEMENTATION EXAMPLE 10

Figure 14:
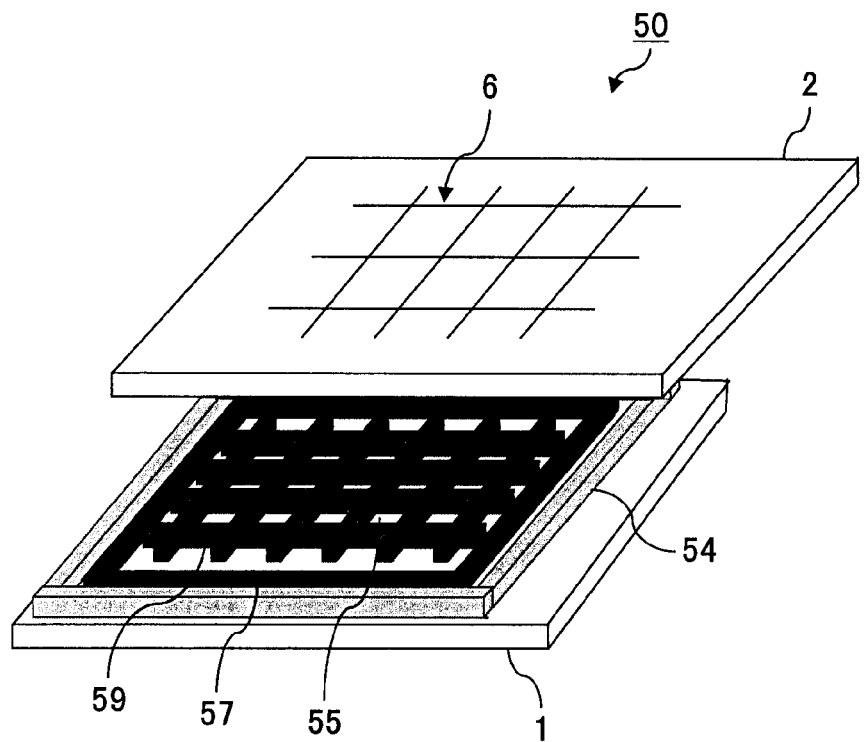
FIG. 14 is an exploded view showing the entire configuration of the liquid crystal display element according to the preferred embodiment, which has the liquid crystal layer of an implementation example 10.

FIG. 14 is an exploded view showing the entire structure of the liquid crystal display element according to this preferred embodiment, which has a liquid crystal layer of another configuration.

In the liquid crystal display element 50 shown in FIG. 14, constituent elements having the same structures as those of the constituent elements comprised by the liquid crystal display element 10 of FIG. 2 are denoted with the same reference numerals.

Figure 15:
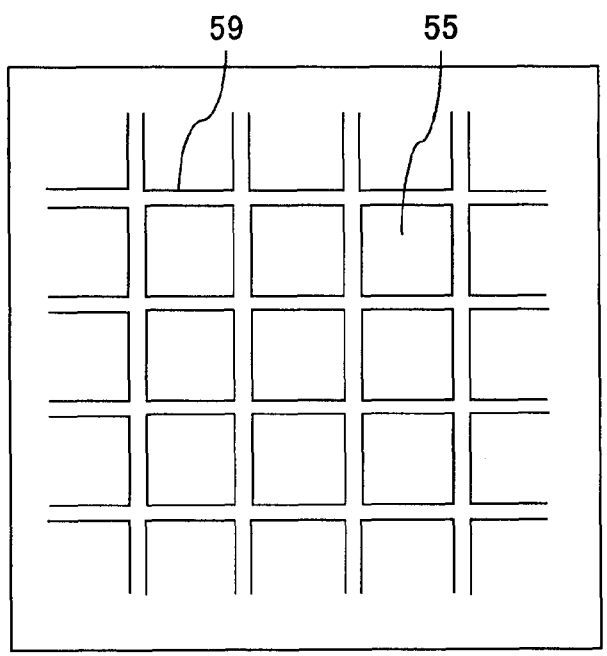
FIG. 15 shows the pattern of wall surface structures in the liquid crystal layer of the implementation example 10.

The liquid crystal display element 50 is characterized in that pixels 55 are not linked with openings in a liquid crystal layer. Namely, as shown in FIG. 15, in the liquid crystal display element 50, the four sides of a pixel 55 of the liquid crystal layer 55 are sealed by an adhesive wall surface structure (a first wall surface structure) 59. Namely, all of side faces at the perimeter of each pixel 55 are covered with the wall surface structure (the first wall surface structure) 59, and each pixel is not linked to its contiguous pixels. Accordingly, the fluidity of the liquid crystal within the pixel 55 is completely suppressed. Additionally, a rectangular second wall surface structure 57 is arranged at the perimeter of the first wall surface structure 59. Also the second wall surface structure 57 has adhesiveness. The first wall surface structure 59 and the second wall surface structure 57 are a same member, and formed in the same process. Additionally, a rectangular seal member 54 is arranged at the perimeter of the second wall surface structure 57. A same member can be used as the first and the second wall surface structures (59, 57) and the seal member 54, and can be formed in the same process.

In the manufacturing process of the liquid crystal display element 50 of the implementation example 10, the liquid crystal is poured into a pixel 55, for example, by being dripped into the pixel 55. Upon completion of the pouring of the liquid crystal into the pixel 55, a liquid crystal cell is manufactured by bonding the substrates 1 and 2 with the use of the wall surface structures 57 and 59, and the seal member 54.

Also the implementation example 10 has a configuration where the liquid crystal poured into a pixel does not contact the seal member 54. This is because the liquid crystal is dripped into only the first and the second wall surface structures 59 and 57, or the first wall surface structure 59. Therefore, a low-cost material and a material having high adhesiveness can be used for the seal member 54. Furthermore, since the first and the second wall surface structures (59, 57) have adhesiveness, the seal member 54 can be also omitted.

In the meantime, air bubbles can be possibly contained in the liquid crystal at the time of the process for dripping the liquid crystal (cholesteric liquid crystal) into the pixel, and for bonding the two substrates thereafter. Accordingly, it is desirable to drip the liquid crystal and to bond the substrates in a vacuum.

The liquid crystal display element 50 of the implementation example 10 can be manufactured also by adding a new process to the process for manufacturing the liquid crystal display elements of the implementation examples 1 to 9. For example, a process for closing openings is executed after the liquid crystal is poured into a pixel in the process for manufacturing the liquid crystal display elements of the implementation examples 1 to 9. In this case, for example, the size of an opening is reduced to a minimum, and a wall surface structure is widened (expanded) by heating and pressurizing the liquid crystal until the opening is closed, after the liquid crystal is poured.

IMPLEMENTATION EXAMPLE 11

FIGS. 16 and 17 show the principal portions of a color liquid crystal display element, which is an implementation example 11 of the present invention. FIG. 16 is a cross-sectional view of the color liquid crystal display element using the cholesteric liquid crystal of selective reflection type.

As shown in this figure, the color liquid crystal display element of the implementation example 11 is configured by sequentially stacking an R (red) display panel (liquid crystal panel) 610, a G (green) display panel (liquid crystal panel) 620, and a B (blue) display panel (liquid crystal panel) 630, among which the B display panel 630 is the uppermost layer.

Figure 17A:
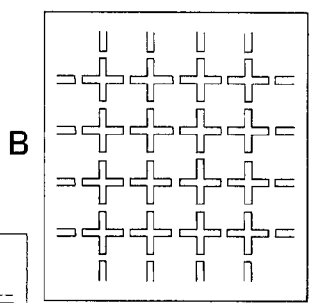
FIG. 17A to 17C respectively show the arrangement patterns of supports of a B (blue) display panel, a G (green) display panel, and an R (red) display panel in the color liquid crystal display element of the implementation example 11.
Figure 17B:
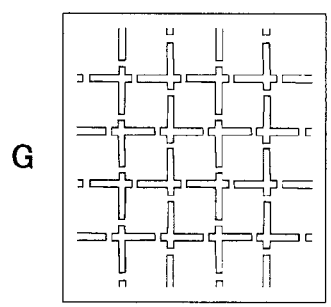
Figure 17C:
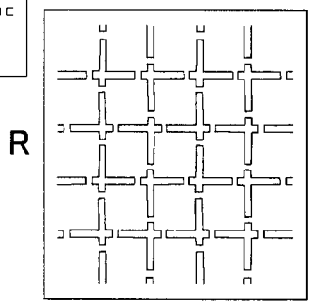

The R display panel 610, the G display panel 620, and the B display panel 630 respectively have the support arrangement patterns shown in FIGS. 17A to C. Namely, the R display panel 610, the G display panel 620, and the B display panel 630 have the support arrangement pattern of the implementation example (see FIG. 5), the support arrangement pattern of the implementation example 4 (see FIG. 8), and the support arrangement pattern of the implementation example 4 respectively. Note that the support pattern of the B display panel 630 is a structure implemented by transforming the support pattern of the implementation example 4. As a result, between the G display panel 620 and the B display panel 630, openings between supports are configured not to be arranged in a linear manner in a vertical direction (direction vertical to the display surface).

The reason of adopting such a structure is that the openings of each of the RGB panels, which are contiguous in the vertical direction, are arranged in a linear manner if all of the support arrangement patterns of the three panels 610 to 630 are implemented as the configuration of the implementation example 1. Since the liquid crystal existing at an opening between supports stays lit up, all of the three RGB colors are viewed as being lit up to user eyes, and the contrast of the display deteriorates. For this reason, the need for providing a black matrix in the positions of openings arises. This implementation example is devised so that the openings of the G display panel 620 and those of the R display panel 630 are not aligned in a linear manner in the vertical direction as described above, thereby eliminating the need for a black matrix.

Namely, as shown in FIG. 16, this display element is configured so that an opening 617 between pixels 25R of the R display panel 610, an opening 627 between pixels 25G of the G panel 620, and an opening 637 between pixels 25B of the B panel 630 are not arranged in a linear manner in the vertical direction. Accordingly, if a support is not completely transparent, noise light, which is caused by the lit-up state at the openings (617, 627) of the lower layer panels (the R display panel 610 and the G display panel 620 in this implementation example), is reduced. If the transparency of a support is low, only the openings 637 of the uppermost layer panel (the B display panel 630 in this implementation example) may be configured not to be arranged in positions in a direction (immediately above) vertical to the openings (617, 627) of the lower layer panels (610, 620).

If the display element is configured without providing the black matrix, the openings of the pixels on the uppermost layer panel are lit up. In this implementation example, the uppermost layer panel is implemented as the B (blue) display panel 630 which makes the sensitivity characteristic of human eyes to an optical wavelength low. Accordingly, with the color liquid crystal display element of this implementation example, deterioration of the display characteristic of the color liquid crystal display element can be reduced even if a black matrix is omitted, and its display performance becomes a level which is not practically problematic. Therefore, a low-cost color liquid crystal display element from which a black matrix is omitted can be implemented with the color liquid crystal display element of this implementation example.

In the above described implementation examples, the amount of time required to pour the liquid crystal is expected to become longer as the number of openings decreases. However, if the viscosity of the liquid crystal is reduced by raising the temperature of the liquid crystal when being poured, the liquid crystal display element can be manufactured for an amount of time, which is not problematic from the viewpoint of a process.

As described above, according to the preferred embodiment of the present invention, in the cholesteric liquid crystal display element having bistability, a variance in a display state, which is a problem and caused by applying pressing force to a display surface, can be prevented. Additionally, resistance to pressing force or a strength against bending are improved, whereby flexibility can be imparted to the cholesteric liquid crystal display element. Additionally, a black matrix becomes unnecessary, whereby a low-cost cholesteric liquid crystal display element can be implemented. Furthermore, since liquid crystal does not contact a seal member, a low-cost material can be used for the seal member. Still further, the seal member can be also omitted by enhancing the adhesiveness of a wall surface structure existing at the perimeter of supports. In this way, a lower-cost cholesteric liquid crystal display element can be provided. Besides, the second wall surface structure is a nearly rectangular enclosing structure. However, if the seal member is used together, the second wall surface structure may not be an enclosing structure. Still further, in that case, the shape of the second wall surface structure may be made identical to that of the first structure arranged for each pixel. It is desirable that the first wall surface structure for a pixel in an end column and the second wall surface structure at the perimeter of the pixel contact although this is not shown. With the second wall surface structure, the fluidity of the liquid crystal can be reduced even in a pixel in the end column.

In the meantime, all of the supports in the implementation examples have shapes based on a cross, which can maximize an aperture ratio. However, the shapes of the supports of the present invention are not limited to those referred to in the implementation examples. Various shapes such as a shape obtained by transforming a cross, etc. can be considered. Additionally, the number of openings for a contiguous pixel may not be necessarily one. A plurality of small openings may be provided between a pixel and its contiguous pixel. Furthermore, a cylinder or a square support may be arranged together within a pixel. With such a configuration, liquid crystal can be prevented from flowing, and also a synergistic effect of being able to reducing the transformation of a pixel can be expected.

Additionally, a wall surface structure and a conventional spacer may be used together.

Furthermore, the above described implementation examples are the liquid crystal display elements of a simple matrix system. However, the present invention is easily applicable also to a liquid crystal display element of an active matrix system. Besides, the shape of a pixel in the implementation examples is rectangular. However, the shape of a pixel of the present invention is not limited to a rectangle, and may take another shape.

Still further, the present invention is applicable not only to the cholesteric liquid crystal display element but also to a liquid crystal display element using another liquid crystal having a memory property of display.

The present invention is superior in flexibility, shock-resistance, and resistance to pressing force against a display surface. Therefore, the present invention is preferable as a display element of electronic paper.

The present invention is preferable also for an electronic book, an electronic newspaper, an electronic poster, a portable terminal such as a PDA (Personal Data Assistant), etc., and a display element of portable appliances such as a wrist watch, etc., for which flexibility is required, in addition to the display element of electronic paper. Furthermore, the present invention is applicable also to a display element of a display unit of a computer of paper type, which is expected to be realized in the future, and to display devices in various fields such as a display decorated in a store, etc.

What is claimed is:

1. A liquid crystal display element comprising:
 a first substrate on which a first electrode is provided;
 a second substrate on which a second electrode is provided;
 a liquid crystal layer provided between the first substrate and the second substrate; and
 a plurality of first wall surface structures arranged to define a plurality of pixels in the liquid crystal layer, wherein
 each gap between each two adjacent first wall surface structures defines an opening which links two contiguous pixels,
 a plurality of openings defined by gaps between the plurality of first wall surface structures are arranged nonlinearly in a first direction along which the first electrode runs and which is parallel to a surface plane of the first substrate, in a second direction along which the second electrode runs and which is parallel to a surface plane of the second substrate, or in both the first direction and the second direction,
 the plurality of first wall surface structures include the first wall surface structures of a first type and the first wall surface structures of a second type,
 each first wall surface structure of the first type has a cross-shaped cross section where an arm of a first length along the first direction and an arm of a second length along the second direction cross,
 each first wall surface structure of the second type has a cross-shaped cross section where an arm of the second length along the first direction and an arm of the first length along the second direction cross, and
 the first length and the second length are different from each other.

2. The liquid crystal display element according to claim 1, wherein the plurality of pixels are rectangular.

3. The liquid crystal display element according to claim 1 further comprising a second wall surface structure configured to enclose the plurality of first wall surface structures.

4. The liquid crystal display element according to claim 1, wherein at least part of each of the plurality of first wall surface structures contacts the first electrode or the second electrode.

5. The liquid crystal display element according to claim 1, wherein the plurality of first wall surface structures define at least two openings for each pixel.

6. The liquid crystal display element according to claim 3, further comprising a seal member provided at an outer perimeter of the second wall surface structure.

7. The liquid crystal display element according to claim 3, wherein liquid crystal is poured only into a region in the liquid crystal layer enclosed by the second wall surface structure.

8. The liquid crystal display element according to claim 3, wherein the second wall surface structure is used as a replacement for a seal member.

9. The liquid crystal display element according to claim 3, wherein the first and the second substrates are adhered and secured by the plurality of first wall surface structures and the second wall surface structure.

10. The liquid crystal display element according to claim 1, wherein the plurality of first wall surface structures are used as a replacement for a black matrix for blocking light.

11. The liquid crystal display element according to claim 1, wherein liquid crystal of the liquid crystal layer has a memory property.

12. The liquid crystal display element according to claim 11, wherein the liquid crystal is cholesteric liquid crystal.

13. An electronic information appliance equipped with the liquid crystal display element according to claim 1.

14. The liquid crystal display element according to claim 1, wherein the first wall surface structures of the first type and the first wall surface structures of the second type are alternately arranged in a manner in which each pixel is defined by two first wall surface structures of the first type and two first wall surface structures of the second type.

15. The liquid crystal display element according to claim 14, wherein the plurality of openings are arranged nonlinearly in both the first direction and the second direction.

* * * * *